US006569953B1

(12) United States Patent
Dehm et al.

(10) Patent No.: US 6,569,953 B1
(45) Date of Patent: *May 27, 2003

(54) PHENOLIC RESIN POLYOLS AND POLYMERS DERIVED FROM THE POLYOLS

(75) Inventors: David C. Dehm, Thornton, PA (US); David A. Hutchings, Tucker, GA (US); Alan K. Randall, Conyers, GA (US); Mark A. Peters, Conyers, GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/318,738

(22) Filed: May 26, 1999

Related U.S. Application Data

(62) Division of application No. 08/562,977, filed on Nov. 27, 1995, now Pat. No. 6,127,491.

(51) Int. Cl.[7] .............................................. C08G 61/00
(52) U.S. Cl. ...................... 525/392; 525/394; 525/395; 525/396; 525/397; 525/461; 525/523; 525/529
(58) Field of Search ................................ 525/461, 523, 525/529, 392, 394, 395, 396, 397; 528/87, 106, 205; 568/718, 716

(56) References Cited

U.S. PATENT DOCUMENTS

| | | | |
|---|---|---|---|
| 3,267,058 A | 8/1966 | Hixenbaugh | 260/23 |
| 3,267,154 A | 8/1966 | Hokama | |
| 3,379,708 A | 4/1968 | Peacock et al. | |
| 3,393,243 A | 7/1968 | Cascurida | 260/615 |
| 3,423,341 A | 1/1969 | Klare et al. | 260/22 |
| 3,457,324 A | 7/1969 | Sekmakas | 260/834 |
| 3,461,068 A | 8/1969 | Peacock et al. | |
| 3,733,365 A | 5/1973 | Yeakey et al. | |
| 4,110,540 A | 8/1978 | Freitag et al. | 568/718 |
| 4,167,538 A | * 9/1979 | Taniguchi et al. | 525/438 |
| 4,337,367 A | * 6/1982 | Kanagawa et al. | 568/720 |
| 4,595,743 A | 6/1986 | Laughner et al. | 528/73 |
| 4,609,717 A | 9/1986 | Greigger et al. | 528/45 |
| 4,895,681 A | 1/1990 | Herrmann et al. | |
| 4,900,671 A | 2/1990 | Pokora et al. | 435/156 |
| 4,962,186 A | 10/1990 | Johnson, Jr. | |
| 5,057,627 A | 10/1991 | Edwards | |
| 5,106,874 A | 4/1992 | Porter et al. | 528/64 |
| 5,362,894 A | 11/1994 | Handwerker et al. | |
| 5,439,724 A | 8/1995 | Rojek | |
| 5,466,843 A | 11/1995 | Cooper | |
| 5,674,970 A | * 10/1997 | Hutchings et al. | 528/205 |
| 5,770,750 A | 6/1998 | Hutchings et al. | 554/223 |
| 6,127,491 A | * 10/2000 | Dehm et al. | 525/461 |

OTHER PUBLICATIONS

Yoshino et al. Synthetic Studies by the Use of Carbonates, etc. Bull. Chem. Soc. Jap. 46 (1973) 553.
Yoshino et al., "Synthetic Studies with Carbonates, etc." J. Chem. Soc. Perkin Trans. I (1977) 1266.
Carlson et al., "Hydroxyalkylation With Cyclic Alkylene Est etc." J. Am. Chem. Soc. 69 (1947) 1952.

* cited by examiner

Primary Examiner—Jeffrey Mullis
(74) Attorney, Agent, or Firm—Banner & Witcoff, Ltd.

(57) ABSTRACT

Phenolic resin polyols are disclosed. The polyols, which contain aliphatic or mixed phenolic and aliphatic hydroxyl groups, are the reaction products of aralkylated phenols or phenol aralkylation polymers with an oxyalkylating agent selected from alkylene oxides and alkylene carbonates. The phenolic resin polyols are versatile intermediates for many polymer systems, including urethanes, epoxies, alkyds, acrylates, and polyesters.

40 Claims, No Drawings

PHENOLIC RESIN POLYOLS AND POLYMERS DERIVED FROM THE POLYOLS

This application is a divisional of Ser. No. 08/562,977 filed Nov. 27, 1995 now U.S. Pat. No. 6,127,491.

FIELD OF THE INVENTION

The invention relates to phenolic resin polyols and their preparation by oxyalkylation. The phenolic resin polyols of the invention have aliphatic or mixed aliphatic/phenolic hydroxyl groups, which makes them versatile intermediates for a broad range of polymer systems, including urethanes, epoxies, alkyds, acrylates, and polyesters.

BACKGROUND OF THE INVENTION

A new class of phenol aralkylation polymers was recently described. These polymers exhibit improved oil solubility, improved compatibility with oil and alkyd-based polymers, urethanes, and epoxies, and a decreased tendency to form color bodies that darken coatings derived from the phenol aralkylation polymers. One way to make the phenol aralkylation polymers is to first aralkylate a phenolic monomer (such as bisphenol A) with a styrene derivative to obtain an aralkylated phenol, and then react the aralkylated phenol with an aryl diolefin to produce the phenol aralkylation polymer. This reaction scheme is illustrated in the simplified scheme below:

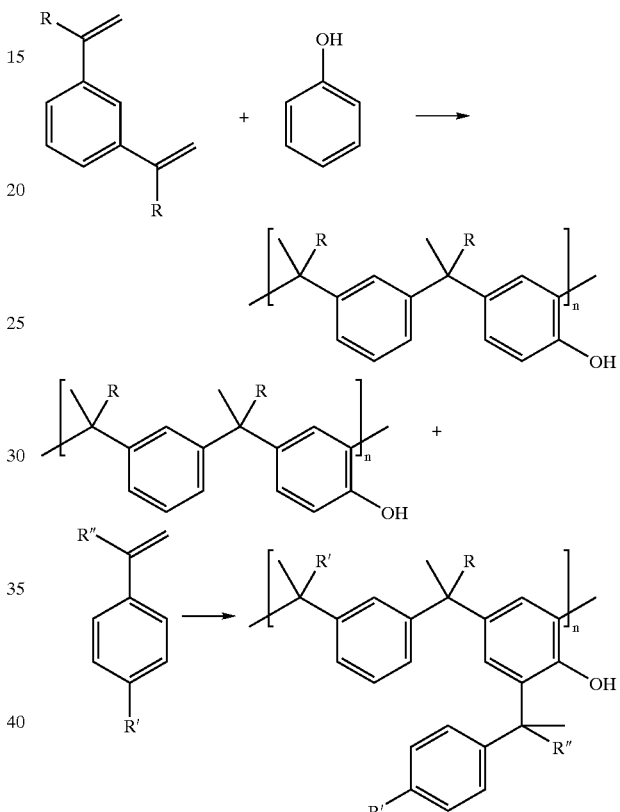

As those skilled in the art will appreciate, these polymers are actually complex mixtures that contain many structural analogs of the compounds pictured above. The types of structures actually present, of course, depend greatly upon the relative proportions of phenolic monomer, styrene derivative, and aryl diolefin.

Phenol aralkylation polymers can be made by first reacting the phenolic monomer with an aryl diolefin to obtain a phenovaryl diolefin polymer, and then aralkylating the phenol/aryl diolefin polymer with a styrene derivative to obtain a phenol aralkylation polymer. In this case, the phenolic component is joined to the aryl diolefin with at least a portion of the phenolic linkages para to the phenolic hydroxyl groups. This process, which produces a phenol aralkylation polymer having a higher melting point, is shown in the simplified scheme below:

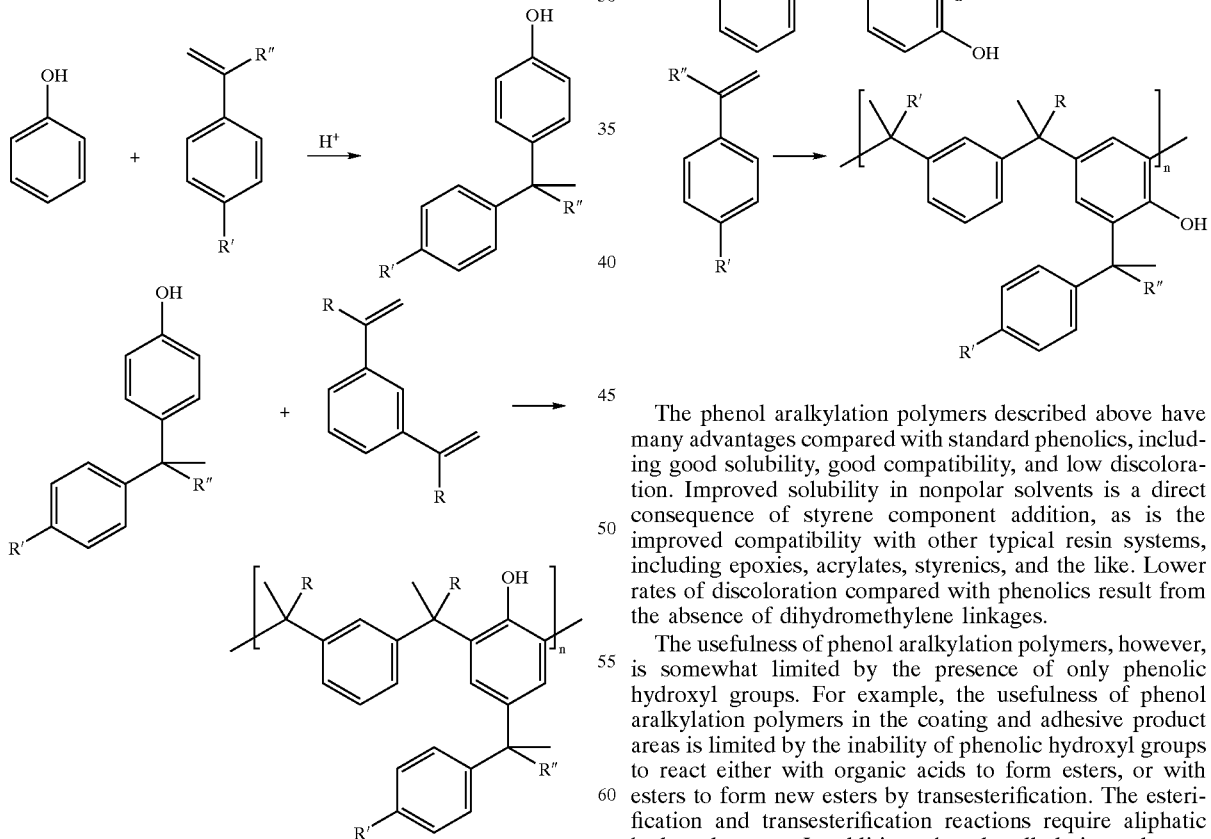

The phenol aralkylation polymers described above have many advantages compared with standard phenolics, including good solubility, good compatibility, and low discoloration. Improved solubility in nonpolar solvents is a direct consequence of styrene component addition, as is the improved compatibility with other typical resin systems, including epoxies, acrylates, styrenics, and the like. Lower rates of discoloration compared with phenolics result from the absence of dihydromethylene linkages.

The usefulness of phenol aralkylation polymers, however, is somewhat limited by the presence of only phenolic hydroxyl groups. For example, the usefulness of phenol aralkylation polymers in the coating and adhesive product areas is limited by the inability of phenolic hydroxyl groups to react either with organic acids to form esters, or with esters to form new esters by transesterification. The esterification and transesterification reactions require aliphatic hydroxyl groups. In addition, phenol aralkylation polymers having only phenolic hydroxyl groups will not react with maleic anhydride to produce unsaturated polyesters. In sum, although the limited reactivity of phenol aralkylation polymers does not preclude their use in coatings and adhesives, it does restrict their usefulness in these applications.

SUMMARY OF THE INVENTION

The invention is a phenolic resin polyol. The phenolic resin polyol is the reaction product of an aralkylated phenol or a phenol aralkylation polymer with an oxyalkylating agent selected from alkylene oxides and alkylene carbonates. Unlike either the aralkylated phenol or phenol aralkylation polymer, the phenolic resin polyol contains at least some aliphatic hydroxyl groups.

The invention includes a process for making phenolic resin polyols. The process comprises reacting an aralkylated phenol or a phenol aralkylation polymer with an oxyalkylating agent selected from alkylene oxides and alkylene carbonates in the presence of an oxyalkylation catalyst under conditions effective to produce the phenolic resin polyol.

Reaction with an alkylene carbonate adds a single oxyalkylene unit, and effectively converts a phenolic hydroxyl group to an aliphatic hydroxyl group. When an alkylene oxide is used, multiple oxyalkylene units can be added. This allows the solubility and compatibility characteristics of the phenolic resin polyols to be adjusted for a particular end use. With either type of oxyalkylating agent, the relative proportion of phenolic and aliphatic hydroxyl groups can be adjusted easily, so a formulator has great flexibility and control over polyol reactivity.

The phenolic resin polyols are exceptionally useful in preparing a wide variety of polymer systems. Like phenol aralkylation polymers, they react, for example, with melamine resins to produce melamine-linked polymers, with di- or polyisocyanates or isocyanate-terminated prepolymers to make polyurethanes, or with epoxy resins to make epoxy thermosets. Unlike phenol aralkylation polymers, the phenolic resin polyols of the invention also react with diacids or polyacids to make polyesters, with fatty acids or fatty esters to make alkyds, and with acrylic acids or esters to make curable acrylate compositions. In sum, we found that incorporation of aliphatic hydroxyl groups into these phenolic polymers expands their usefulness in polymer systems, yet still maintains the advantages of phenol aralkylation polymers in many systems.

DETAILED DESCRIPTION OF THE INVENTION

The phenolic resin polyols of the invention are the reaction products of an aralkylated phenol or a phenol aralkylation polymer with an oxyalkylating agent selected from alkylene oxides and alkylene carbonates.

"Aralkylated phenols" useful in the invention are made by aralkylating a phenolic monomer with at least one styrene derivative. A typical reaction is shown below:

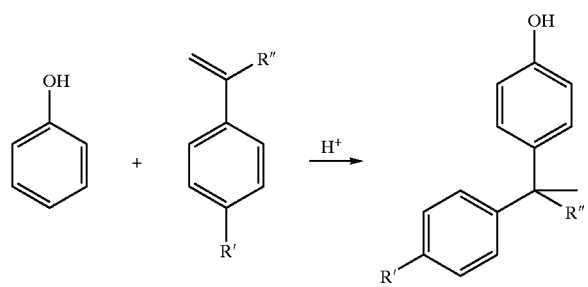

"Phenol aralkylation polymers" useful in the invention derive from a phenolic monomer, at least one styrene derivative, and a coupling agent, which is typically an aryl diolefin. Mixtures of different phenolic monomers, styrene derivatives, or coupling agents can be used to modify physical properties.

Phenol aralkylation polymers are produced by a process that has at least two steps. The reaction sequence is controlled to provide phenol aralkylation polymers that have the desired properties. In one process, a phenolic monomer reacts with at least one styrene derivative to produce an aralkylated phenol. The aralkylated phenol then reacts with a coupling agent, preferably an aryl diolefin, to produce the phenol aralkylation polymer. A second process reacts the phenolic monomer first with the coupling agent, and then with the styrene derivative to produce the phenol aralkylation polymer. Both of these processes are illustrated in the Background section. In either process, part of the styrene derivative or coupling agent can be withheld for later reaction to modify performance characteristics of the phenol aralkylation polymer.

The aralkylated phenols or phenol aralkylation polymers described above react with an oxyalkylating agent selected from alkylene oxides and alkylene carbonates in the presence of an oxyalkylation catalyst under conditions effective to produce phenolic resin polyols of the invention.

Phenolic monomers useful in the invention include phenols that have at least two free "reactive" positions, i.e., two aromatic C—H bonds that are activated for electrophilic aromatic substitution. In other words, the phenolic monomers have at least two aromatic C—H groups in positions either ortho or para to a phenolic hydroxyl group. Phenol, for example, has three free reactive positions: two ortho and one para to the phenolic hydroxyl group.

The phenols may be substituted with one or more $C_1$–$C_{20}$ alkyl, aryl, or aralkyl substituents, provided that at least two reactive positions remain. Suitable substituted phenols include, for example, o-cresol, m-cresol, p-cresol, m-isopropyl phenol, 3,5-xylenol, 3,5-diisopropylphenol, p-t-butylphenol, and the like, and mixtures thereof. Suitable phenols include those having more than one phenolic hydroxyl group, such as hydroquinone, resorcinol, catechol, and $C_1$–$C_{20}$ alkyl, aryl, and aralkyl-substituted derivatives of these phenols, provided again that the phenolic monomer has at least two activated aromatic C—H bonds. Examples include 2-ethylresorcinol, 4-methylresorcinol, 5-ethylresorcinol, 3-methylcatechol, 4-methylcatechol, 2,3-dimethylhydroquinone, 2,5-diethylhydroquinone, 2,6-dimethylhydroquinone, 3,4-dimethylcatechol, 3,5-diethylcatechol, and the like, and mixtures thereof. For any of the alkyl, aryl, or aralkyl-substituted phenolic monomers, the substituent or substituents may derive from aralkylation of a phenol with a styrene derivative.

Suitable phenolic monomers also include alkyl, aryl, and aralkyl-substituted polyhydroxy-polycyclic aromatic phenols such as substituted dihydroxynaphthalenes, dihydroxyanthracenes, and dihydroxyphenanthrenes. Also included are polynuclear phenolic monomers, such as bisphenol A, bisphenol F, dihydroxy-biphenyl bisphenols (including those prepared by the Mead Process; see U.S. Pat. No. 4,900,671, which is incorporated herein by reference), and coupling products derived from phenols and aldehydes or ketones. Preferred phenolic monomers, because of their low cost and availability, are phenol, bisphenol A, bisphenol F, hydroquinone, resorcinol, catechol, p-t-butyl phenol, p-cumyl phenol, and p-octyl phenol.

Styrene derivatives useful in the invention are aryl-substituted alkenes. Examples include styrene, α-methylstyrene, β-methylstyrene, o-, m-, and p-methylstyrenes, α-methyl-p-methylstyrene, vinyltoluenes, t-butylstyrenes, ethylstyrenes, di-t-butylstyrenes, isopropenylnaphthalenes, 2-methyl-1,1-diphenyl-1-propene, 1-phenyl-1-pentene, and the like, and mixtures thereof. Styrene derivatives include aryl-substituted alkenes in which the aryl group is, for example, phenyl (as in styrene), naphthyl, biphenyl, and alkyl-, aryl-, aralkyl-, or halogen-substituted derivatives of phenyl, naphthyl, and biphenyl. The styrene derivatives can include other functional groups such as carboxylic acids (e.g., cinnamic acid) or esters (e.g., methyl cinnamate). Such functionalized styrene derivatives provide a valuable way to introduce carboxyl functionality into the phenolic resin polyols. Preferred styrene derivatives are styrene, α-methylstyrene, vinyltoluenes, t-butylstyrenes, ethylstyrenes, di-t-butylstyrenes, and mixtures thereof.

Coupling agents useful in the invention are compounds that can join activated aromatic rings of phenolic monomers together by two electrophilic addition reactions. Preferred coupling agents are aryl diolefins and aldehydes. Aryl diolefins are generally preferred because they improve the solubility of the phenolic resin polyols in mineral spirits and avoid potential formaldehyde emission issues. Aldehydes offer a low-cost alternative to the diaryl olefins. Suitable aldehydes include, for example, formaldehyde, acetaldehyde, benzaldehyde, glyoxal, and the like, and mixtures thereof. Formaldehyde is particularly preferred.

Aryl diolefins useful in the invention have at least one aromatic ring and two polymerizable carbon-carbon double bonds, which may or may not be attached to the same aromatic ring. The olefin groups can be substituted with one or more $C_1$–$C_5$ alkyl groups. The aromatic ring moiety can be, for example, benzene, naphthalene, biphenyl, or the like. The aromatic ring or rings can be substituted with one or more $C_1$–$C_5$ alkyl groups.

Suitable aryl diolefins include, for example, divinylbenzenes, diiso-propenylbenzenes, divinylnaphthalenes, divinylbiphenyls, isopropenylstyrenes, diisopropenylnaphthalenes, diisopropenylbiphenyls, and the like, and mixtures thereof. Preferred aryl diolefins are divinylbenzenes and diisopropenylbenzenes, which are commercially available. One preferred and commercially available mixture of divinylbenzenes contains 80% divinylbenzenes (m- and p-isomers) and 20% ethylstyrenes. Diisopropenylbenzenes are also preferred.

The aryl diolefins can be produced in situ, if desired, by dehydrating the corresponding diol precursors, usually at elevated temperatures under acidic conditions. For example, diisopropenylbenzenes can be produced from the corresponding methylbenzylic alcohols. When a diol precursor is used, it is typically added to the phenolic monomer incrementally under conditions effective to allow simultaneous removal of water as the olefin is generated by dehydration.

The relative amounts of phenolic monomer, styrene derivative, and coupling agent (diaryl olefin or aldehyde) used depend on many factors, including the type of aralkylated phenol or phenol aralkylation polymer desired, the desired product molecular weight, the desired hydroxyl functionality, and so on. Generally, the mole ratio of coupling agent to phenolic monomer used is within the range of about 0.2 to about 1.1, more preferably from about 0.4 to about 0.8. The amount of styrene derivative used depends mainly on the desired degree of styrenation, and is limited by the number of free reactive aromatic C—H sites on the phenolic monomer. Generally, from about 20% to about 100%, preferably from about 40% to about 95% of the sites available for styrenation will be used. The average hydroxyl functionality of the aralkylated phenol or phenol aralkylation polymer is preferably within the range of about 2 to about 10, and more preferably from about 2 to about 8.

A catalyst is generally used in the aralkylation processes used to make the aralkylated phenol or phenol aralkylation polymer. Typically, an acid catalyst is used. Suitable acid catalysts include alkylsulfonic acids, arylsulfonic acids, phenol sulfonic acids, sulfonated phenolic polymers, fixed-bed catalysts such as sulionated polystyrene, sulfuric acid, phosphoric acid, hydrochloric acid, phosphate mono- and diesters, latent acid catalyst systems (acid chlorides, phosphorous oxychlorides, amine salts), halogenated organic acids (chloroacetic, trifluoroacetic acid), and organic acids having a pKa less than about 1.5. As those skilled in the art will appreciate, the amount of acid catalyst needed depends on many factors, including the effective acidity and type of catalyst selected. The amount used can vary over a wide range; preferably, the amount of acid catalyst used is within the range of about 0.001 to about 5 wt. % based on the total weight of the monomers used. Strong acids such as the alkyl- and arylsulfonic acids are preferably used in an amount less than about 0.2 wt. %, while weaker acids such as fixed-bed catalysts may require significantly higher levels.

Although any suitable temperature can be used for the aralkylation reactions, a temperature within the range of about 120° C. to about 180° C. is preferred. Ordinarily, the temperature is adjusted to permit completion of the reaction within a desired amount of time. After aralkylation is complete, the product is generally neutralized with an alkali metal hydroxide, tertiary amine, or other alkaline material. The alkaline material is often then conveniently used as an oxyalkylation catalyst for the next step.

The phenolic resin polyols of the invention are made by reacting an aralkylated phenol or a phenol aralkylation polymer with an oxyalkylating agent selected from the group consisting of alkylene oxides and alkylene carbonates.

Alkylene oxides contain an epoxide group. Suitable alkylene oxides are epoxides in which one or both of the epoxide carbons is substituted with hydrogen or a $C_1$–$C_{10}$ alkyl, aryl, or aralkyl group. Preferred alkylene oxides are $C_2$–$C_4$ epoxides, including ethylene oxide, propylene oxide, isobutylene oxide, 1,2-butylene oxide, and 2,3-butylene oxide. Alkylene oxides that contain halogenated alkyl groups, such as epihalohydrins, can also be used. Propylene oxide, ethylene oxide, and isobutylene oxide are particularly preferred.

Alkylene carbonates are cyclic carbonates that contain —C—$CO_2$— in a five-membered ring. Suitable alkylene carbonates are cyclic carbonates in which one or both of the aliphatic ring carbons is substituted with hydrogen or a $C_1$–$C_{10}$ alkyl, aryl, or aralkyl group. Preferred alkylene carbonates are ethylene carbonate, propylene carbonate, and butylene carbonates.

The invention includes a process for making phenolic resin polyols. This process involves oxyalkylation of an aralkylated phenol or a phenol aralkylation polymer with an alkylene carbonate or an alkylene oxide. The process generally requires an oxyalkylation catalyst; a catalyst can be omitted, but reaction times are long, and high temperatures are needed. Generally, the aralkylated phenol or phenol aralkylation polymer is heated with the alkylene carbonate or alkylene oxide in the presence of the oxyalkylation catalyst under conditions effective to produce the phenolic resin polyol.

Suitable oxyalkylation catalysts include alkali metals; alkali metal and alkaline earth metal alkoxides, hydroxides, hydrides, carbonates, bicarbonates, oxides, sulfonates, amides, acetonylacetates, carboxylates, and phenolates; tertiary amines; alkylammonium halides, hydroxides, alkoxides, bicarbonates, and carbonates; Lewis acids (e.g., boron trifluoride, aluminum chloride, tin tetrachloride); inorganic acids (e.g., HCl, $H_2SO_4$); carboxylic acids; sulfonic acids; metalloporphrins; dialkylzinc compounds; and double metal cyanide compounds. Other catalysts useful for oxyalkylation appear in K. J. Ivin and T. Saegusa, *Ring-Opening Polymerization*, Vol. 1 (Elsevier) 1984, Chapter 4, "Cyclic Ethers." Additional examples are found in U.S. Pat. Nos. 3,393,243, 4,595,743, and 5,106,874, the teachings of which are incorporated herein by reference.

The amount of catalyst needed in any case depends on the type of catalyst used, the particular catalyst chosen, the reaction conditions used, the nature of the aralkylated phenol or aralkylation polymer, and other factors. Generally, the amount of catalyst needed will be within the range of about 1 ppm to about 5 wt. % based on the amount of phenolic resin polyol. Those skilled in the art will understand how to adjust the amount of catalyst used based on these factors to permit an efficient synthesis of the phenolic resin polyols.

The relative amounts of alkylene carbonate or alkylene oxide used depend on the desired product. When an alkylene carbonate is used as the oxyalkylating agent, a maximum of one oxyalkylene unit is added to the aralkylated phenol or phenol aralkylation polymer per phenolic hydroxyl group, even if an excess amount of alkylene carbonate is used. If a phenolic resin polyol containing both phenolic and aliphatic hydroxyls is desired, then the alkylene carbonate can be added in amount sufficient to cap only some of the phenolic hydroxyl groups. The ability to make phenolic resin polyols that have both phenolic and aliphatic hydroxyl groups is an advantage of the invention because the reactivity of these polyols can be fine-tuned to suit a particular end-use application.

When an alkylene oxide is used as the oxyalkylating agent, one or more oxyalkylene units can be added to each of the phenolic hydroxyl groups of the aralkylated phenol or phenol aralkylation polymer. As with alkylene carbonates, alkylene oxides can be added in amount sufficient to cap only some of the phenolic hydroxyl groups. Unlike alkylene carbonates, alkylene oxides allow addition of multiple oxyalkylene units to the phenolic hydroxyl groups. This feature permits the preparation of a wide variety of products that differ in the degree of alkoxylation. A large number of oxyalkylene units may be desirable for many purposes, for example: introducing flexibility into coatings, modifying solubility characteristics of the polyols, or reducing viscosity.

The oxyalkylation may be performed at any desired temperature. Generally, the oxyalkylation occurs at a temperature within the range of about 20° C. to about 250° C., but the required temperature depends significantly on the type of catalyst used. For example, oxyalkylation using propylene carbonate and potassium hydroxide as a catalyst is conveniently performed at temperatures in the 100° C. to 250° C. range, and more preferably in the 140° C. to 210° C. range. In contrast, propoxylation with propylene oxide using some Lewis acid catalysts can be performed at room temperature.

The rate of oxyalkylation can be greatly enhanced, particularly in the case of viscous reaction products, when a vacuum is applied during this step. Reaction times can be reduced by 100% or more simply by reducing the pressure in the reactor. Preferably, the vacuum applied will be sufficient to assist removal of carbon dioxide from the viscous polymer mixture, but will not strip unreacted propylene carbonate from the mixture. A reactor pressure of about 0.3 to about 0.6 atmospheres is preferred for oxyalkylation.

After the oxyalkylation reaction is complete, insoluble salts or catalysts can be removed, if desired by any convenient method. In one method, the phenolic resin polyol is simply diluted with mineral spirits and is filtered using a filter aid (e.g. CELITE filter aids, or the like). Vacuum stripping of the mineral spirits gives a purified phenolic resin polyol.

The phenolic resin polyols of the invention are exceptionally useful in preparing a wide variety of polymer systems. Like phenol aralkylation polymers, they react with melamine resins to produce melamine-linked polymers. Suitable melamine resins include commercial grade hexamethoxymethylmelamines such as, for example, CYMEL 303 crosslinking agent, a product of American Cyanamid Company. Example 19 below illustrates the preparation of a melamine coating from a phenolic resin polyol of the invention.

A polyurethane composition is made by reacting a phenolic resin polyol of the invention with a di- or polyisocyanate or an isocyanate-terminated prepolymer. Prepolymers derived from the phenolic resin polyols can be used. Optionally, a low molecular weight chain extender (diol, diamine, or the like) is included. Suitable di- or polyisocyanates are those well known in the polyurethane industry, and include, for example, toluene diisocyanates (TDIs), methylene diphenylene diisocyanate (MDI), polymeric MDIs, carbodiimide-modified MDIs, hydrogenated MDIs, isophorone diisocyanate, and the like. Isocyanate-terminated prepolymers can be made in the usual way from a polyisocyanate and a polyether polyol, polyester polyol, or the like. The polyurethane is formulated at any desired NCO index, but it is preferred to use an NCO index close to 1. If desired, all of the available NCO groups are reacted with hydroxyl groups from the phenolic resin polyols and any chain extenders. Alternatively, an excess of NCO groups remain in the product, as in a moisture-cured polyurethane. Many types of polyurethane products can be made, including, for example, adhesives, sealants, coatings, and elastomers. Example 5 below shows how to make a urethane coating from a phenolic resin polyol of the invention.

The invention includes epoxy thermosets made by reacting a phenolic resin polyol of the invention with an epoxy resin. Suitable epoxy resins generally have two or more epoxy groups available for reaction with the hydroxyl groups of the phenolic resin polyol. Particularly preferred epoxy resins are bisphenol-A diglycidyl ether and the like. Examples 15 and 17 below show how to make epoxy coatings of the invention from phenolic resin polyols. Other suitable methods for making epoxy thermosets are described in U.S. Pat. No. 4,609,717, the teachings of which are incorporated herein by reference. In addition, epoxies can be formed by reacting the phenolic resin polyols of the invention with epoxy resins in the presence of an imidazole catalyst such as 2-phenyl imidazole.

Polyesters of the invention are reaction products of the phenolic resin polyols with an anhydride, a dicarboxylic acid, or polycarboxylic acid. Suitable anhydrides and carboxylic acids are those commonly used in the polyester industry, and include, for example, phthalic anhydride, phthalic acid, maleic anhydride, maleic acid, adipic acid, isophthalic acid, terephthalic acid, sebacic acid, succinic acid, trimellitic anhydride, and the like, and mixtures thereof. Example 15 shows how a polyester made from a phenolic resin polyol and trimellitic anhydride can be used in an epoxy coating. Other suitable methods for making polyesters are described in U.S. Pat. No. 3,457,324, the teachings of which are incorporated herein by reference.

The invention includes alkyds made from the phenolic resin polyols. In one method, the phenolic resin polyol is combined with a fatty acid and optionally a low molecular weight polyol and/or an anhydride, to produce the alkyd. In another method, a fatty acid ester reacts with the phenolic resin polyol and, optionally, an anhydride to produce the alkyd. Suitable fatty acids and fatty acid esters for making the alkyds are those generally known in the alkyd resin art, and include, for example, oleic acid, ricinoleic acid, linoleic acid, licanic acid, and the like, and mixtures thereof, and their mono-, di-, and triglyceryl esters. Tung oil is a particularly preferred fatty ester. Mixtures of saturated and unsaturated fatty acids and esters can be used. Alkyds of the invention are particularly useful for making alkyd coatings. Typically, the resin is combined with an organic solvent, and the resin solution is stored until needed. A drying agent such as cobalt acetate is added to the solution of alkyd resin, the solution is spread onto a surface, the solvent evaporates, and the resin cures leaving an alkyd coating of the invention. Examples 6 and 7 show how to make alkyd coatings from phenolic resin polyols of the invention. Other suitable methods for making alkyd resins and coatings are described in U.S. Pat. No. 3,423,341, the teachings of which are incorporated herein by reference.

The invention includes polyurethane-modified alkyds (uralkyds) prepared from the phenolic resin polyols. These resins are valuable for making uralkyd coatings. As those skilled in the art will appreciate, there are many ways to make uralkyds. One way is to react a phenolic resin polyol with a fatty acid, a low molecular weight polyol, a di- or polyisocyanate, and optionally, an anhydride, to produce a uralkyd. A second method reacts the phenolic resin polyol with a fatty acid ester, a di- or polyisocyanate, and optionally, an anhydride, to produce the uralkyd. Examples 8, 9, 10, 12, and 13 illustrate the versatility of phenolic resin polyols in several uralkyd formulations. Additional methods for making uralkyds are described in U.S. Pat. No. 3,267,058, the teachings of which are incorporated herein by reference.

Curable acrylate compositions of the invention are prepared by reacting the phenolic resin polyols with an acrylic or methacrylic acid or ester. Esterification of the polyol hydroxyl group gives a polymer having ethylenic unsaturation that can be crosslinked to produce a cured acrylate composition. Example 18 shows how to make an acrylate/urethane coating from a phenolic resin polyol of the invention using acrylic acid and 1,6-hexanediol diacrylate.

The phenolic resin polyols have many advantages over other phenolic polymers. Unlike the aralkylated phenols and phenol aralkylation polymers, they react with diacids or polyacids to make polyesters, with fatty acids or fatty esters to make alkyds, and with acrylic acids or esters to make curable acrylate compositions. Thus, incorporation of aliphatic hydroxyl groups into these phenolic polymers expands their usefulness in polymer systems, especially coating applications. The ability to make phenolic resin polyols that have any desired proportion of phenolic and aliphatic hydroxyl groups allows the reactivity of these polyols to be adjusted to suit a particular end-use application. Finally, the ability to incorporate multiple oxyalkylene units into the structure of the phenolic resin polyols using alkylene oxides allows formulators to introduce flexibility into coatings, modify solubility characteristics of the polyols, or reduce viscosity.

The following examples merely illustrate the invention. Those skilled in the art will recognize many variations that are within the spirit of the invention and scope of the claims.

EXAMPLE 1

Preparation of a 2-Functional Phenolic Resin Polyol: Oxyalkylation with Propylene Carbonate A three-liter resin kettle equipped with mechanical stirrer, addition funnel, condenser/Dean-Stark trap, and inlets for nitrogen and vacuum, is charged with bisphenol A (456 g) and o-xylene (200 g), and the mixture is heated to 140° C. under nitrogen. Methanesulfonic acid (70%, 0.6 g) is added, and water is removed by azeotropic distillation. T-butylstyrene (960 g) is added over 0.5 h at 150–160° C., and the mixture is kept at that temperature for one more hour. Aqueous potassium hydroxide (50% solution, 1.5 g) is added at 160° C., and water is removed by azeotropic distillation.

Propylene carbonate (408 g) is added at 170° C., and the mixture is heated at 170° C. for 14 h in an open system to vent carbon dioxide generated in the reaction. Analysis by FTIR indicates >90% conversion of propylene carbonate. Mineral spirits (400 g) is added, and the mixture is heated to 170° C. The hot mixture is filtered using a 30 micron fritted glass funnel and CELITE 545 filter aid. The filtrate is recharged to the reactor, heated to 160–170° C., and distilled under vacuum (27 in. Hg) to remove all solvent. The mixture is cast into an aluminum pan and allowed to cool and flake.

EXAMPLE 2

Preparation of a 4-Functional Phenolic Resin Polyol: Oxyalkylation with Propylene Carbonate The apparatus of Example 1 is used. The reactor is charged with bisphenol A (456 g) and o-xylene (200 g), and is heated to 140° C. under nitrogen. Methanesulfonic acid (70%, 0.6 g) is added, and water is removed by azeotropic distillation. Divinylbenzene (80%, 162.5 g) is added over 15 min. at 150–160° C., and the mixture is kept at that temperature for another 5 min. T-butylstyrene (720 g) is added over 20 min. at 150–160° C., and heating continues at that temperature for one more hour. Aqueous potassium hydroxide (50% solution, 1.5 g) is added at 160° C., and water is removed by azeotropic distillation.

Propylene carbonate (408 g) is added at 170° C., and the mixture is heated at 170° C. for 14 h in an open system to vent carbon dioxide generated in the reaction. Analysis by FTIR indicates >90% conversion of propylene carbonate. Mineral spirits (400 g) is added, and the mixture is heated to 170° C. The hot mixture is filtered using a 30 micron fritted glass funnel and CELITE 545 filter aid. The filtrate is recharged to the reactor, heated to 160–170° C., and distilled under vacuum (27 in. Hg) to remove all solvent. The mixture is cast into an aluminum pan and allowed to cool and flake.

EXAMPLE 3

Preparation of a 6-Functional Phenolic Resin Polyol: Oxyalkylation with Propylene Carbonate The apparatus of Example 1 is used. The reactor is charged with bisphenol A (565 g) and o-xylene (200 g), and is heated to 140° C. under nitrogen. Methanesulfonic acid (70%, 0.7 g) is added, and water is removed by azeotropic distillation. Divinylbenzene (80%, 268 g) is added over 15 min. at 150–160° C., and the mixture is kept at that temperature for another 5 min. T-butylstyrene (661 g) is added over 20 min. at 150–160° C., and heating continues at that temperature for one more hour. Aqueous potassium hydroxide (50% solution, 1.8 g) is added at 160° C., and water is removed by azeotropic distillation.

Propylene carbonate (505 g) is added at 170° C., and the mixture is heated at 170° C. for 14 h in an open system to vent carbon dioxide generated in the reaction. Analysis by FTIR indicates >90% conversion of propylene carbonate. Mineral spirits (450 g) is added, and the mixture is heated to 170° C. The hot mixture is filtered using a 30 micron fritted glass funnel and CELITE 545 filter aid. The filtrate is recharged to the reactor, heated to 160–170° C., and distilled under vacuum (27 in. Hg) to remove all solvent. The mixture is cast onto an aluminum pan and allowed to cool and flake.

EXAMPLE 4

Preparation of a 6-Functional Phenolic Resin Polyol: Oxyalkylation with Propylene Oxide A phenol aralkylation polymer is prepared from bisphenol A, divinylbenzene, and tert-butylstyrene the general method of the first paragraph of Example 3. After aralkylation with t-butylstyrene, aqueous potassium hydroxide (14.7 g, 0.25 wt. % based on the total amount of expected phenolic resin polyol) and the phenol aralkylation polymer (287 g, 1 eq.) are dissolved in toluene and water is removed (to less than 0.1 wt. %) by azeotropic distillation. The salt is heated with stirring at 120° C., and propylene oxide (412 g, about 7 moles of PO per phenolic hydroxyl group) is added gradually to maintain a maximum reactor pressure of 30–40 psi. After the addition is complete, the mixture is kept at 120° C. until the drop in reactor pressure indicates that the reaction is finished. The product is a phenolic resin polyol having mostly secondary aliphatic hydroxyl groups.

EXAMPLE 5

Urethane Coating Composition

A two-pack urethane coating system is prepared from a phenolic resin polyol as follows. A 6-functional phenolic resin polyol prepared generally by the procedure of Example 3 (25 g, 0.064 eq) is combined with a glycerin-started polyoxypropylene triol (240 mg KOH/g hydroxyl number, 25 g, 0.11 eq) and AROMATIC 150 solvent (20.8 g, product of Exxon Chemicals). The polyol mixture is combined with RUBINATE 1790 isocyanate (32.9 g, 0.18 eq, 1.05 NCO/OH index, product of ICI) and mixed well.

One mil coatings are drawn down on steel test panels at 15 minute intervals after mixing the two components. The tack-free time for all samples is about 1 h. A sample taken at 20 min. shows a pencil hardness of HB after 24 h and 2H after 3 days. Cross-hatch back side impact adhesion stays at 5B (0% removal of coating from cross hatch with tape) up to impacts of 20 inch pounds in samples cured for 3 days. A sample taken at 65 min. also shows a pencil hardness of HB after 24 h and 2H after 3 days. Cross-hatch back side impact adhesion stays at 5B up to impacts of 40 inch pounds in samples cured for 3 days. (Cross-hatch rating scale in approximate percent removal of coating with tape: 5B=0%; 4B=5%; 3B=10%; 2B=15%; 1B=25%; 0B>35 %.)

EXAMPLE 6

Alkyd Coating Composition

A 4-functional phenolic resin polyol is prepared by the general procedure of Example 2, except that the aralkylation step with tert-butylstyrene is omitted. A solution of the phenolic resin polyol (200 g of 75% solids solution in o-xylene) is combined with tung oil (200 g) in a stirred one-liter resin kettle equipped with stirrer and nitrogen sparger. Potassium hydroxide (50% aqueous solution, 1.0 g) is added. The mixture is heated to 245° C. for 6 h, after which it is viscous. The mixture is diluted to 50% solids with o-xylene to produce a low-viscosity liquid suitable for coating applications.

A cobalt drier is added (0.01%), and the diluted coating sample is drawn down on a steel plate to give a 1 mil coating after drying to a tack-free set in 4 h. The resulting coating has high gloss and good pencil hardness (HB) in 10 days. Cross hatch adhesion is excellent, showing no adhesive tape pick off at back side impacts of 40 inch pounds. A control coating made with tung oil only has a longer drying time and a wavy surface (a characteristic of fast surface drying, but slow drying in the depth of the coating).

The alkyd coating performs well, but has low solubility in mineral spirits. Thus, this coating component is best used in systems not based on mineral spirits.

EXAMPLE 7

Alkyd Coating Composition

A 4-functional phenolic resin polyol is prepared by the general procedure of Example 2, except that a 50/50 (m:m) mixture of tert-butylstyrene (360 g) and α-methylstyrene (266 g) is used in the aralkylation step rather than t-butylstyrene alone.

This phenolic resin polyol is used to make an alkyd coating composition by transesterification with tung oil as described in Example 6. The transesterification product shows excellent solubility in mineral spirits.

A sample of the transesterification product is diluted to 60% solids with mineral spirits. A cobalt drier is added (0.01%), and the diluted coating sample is drawn down on a steel plate to give a 1 mil coating after drying to a tack-free set in 4 h. The resulting coating has high gloss and good pencil hardness (F) in 10 days. Cross hatch adhesion is excellent, showing no adhesive tape pick off at back side impacts of 40 inch pounds. The transesterification product, because of its excellent solubility properties, is particularly useful in commercial solvent-borne alkyd and uralkyd coating systems.

Another sample of the transesterification product (60% solids in mineral spirits) is mixed 50:50 by weight with a commercially available clear gloss interior wood finish. The mixture and control sample are drawn down in 1-mil coatings on steel panels and allowed to dry for 10 days. The 50:50 sample has equivalent pencil hardness (HB) and superior impact performance (5B versus 0B) compared with the commercial control sample at back side impacts of 40 inch pounds.

EXAMPLE 8

Preparation of a Polyurethane-Modified Alkyd (Uralkyd) Coating

Reaction of a phenolic resin polyol with a triglyceride gives an ester-exchanged system in which some of the phenolic resin polyol is esterified with unsaturated fatty acid, while some of the triglyceride is converted to mono- and diglycerides. This system can be cured with a drier to give a good coating, but a faster curing system results if the transesterified mixture is reacted with a diisocyanate to give a uralkyd. This approach is illustrated as follows:

A solution of 6-functional phenolic resin polyol prepared as in Example 3 (200 g, 75 wt. % solids in o-xylene) is combined with tung oil (200 g) in a stirred, one-liter resin kettle equipped with a stirrer and nitrogen sparger. Potassium hydroxide (50% aqueous solution, 1.0 g) is added, and the mixture is heated to 245° C. for 6 h. The transesterification reaction product, a viscous liquid, is diluted to 50 wt. % solids with o-xylene to give a low-viscosity product suitable for use in coating applications.

A fast-drying uralkyd is produced as follows: A sample of the transesterification reaction product described above (100 g, 70% solids in o-xylene) is heated with stirring to 150° C. Isophorone diisocyanate (3.5 g) is added to the mixture, and heating continues for 15 min. Infrared analysis indicates a 95% conversion of isocyanate groups to urethane links. Part of the uralkyd solution is diluted to 55 wt. % solids with mineral spirits, and 0.01 wt. % of a cobalt drier is added to give a coating system suitable for drawing into coatings on steel plates. Samples drawn into films using a number 6 bar produce a 1-mil film with a 3-hour tack-free time. The resulting coatings achieve a 3B pencil hardness in 24 h, and an HB hardness in 4–5 days. Cross-hatch back side impact adhesion stays at 5B up to impacts greater than 60 inch pounds in samples cured for 2 weeks.

Advantages of the uralkyd coatings as exemplified above include good toughness and mar resistance, fast dry times, good compatibility with uralkyds, reduced diisocyanate requirements compared with conventional uralkyds, incorporation of a UV absorber, and good color stability compared with typical phenolic coatings.

EXAMPLE 9

Preparation of a Polyurethane-Modified Alkyd (Uralkyd) Coating

This example describes the preparation of a uralkyd coating made from an isocyanate-capped monoglyceride and a phenolic resin polyol.

A monoglyceride is prepared as follows. A 1.5-liter reactor is charged with safflower oil (585 g), linseed oil (250 g), glycerol (164 g), lithium hydroxide monohydrate (6.0 g), and o-xylene (100 g). The mixture is heated at 250° C. with stirring for 10 h. Alcohol tolerance is used to follow the reaction. When constant alcohol solubility is attained, the reaction is terminated. The primary component of the reaction mixture is a monoglyceride.

The monoglyceride is converted to an isocyanate-terminated prepolymer as follows: A 500-mL reactor is charged with a sample of the monoglyceride (90 g) and mineral spirits (60 g). The mixture is heated to 150° C., and isophorone diisocyanate (30 g) is added. The mixture is held for 4 min. at 150° C.

A 6-functional phenolic resin polyol prepared as in Example 3 (60 wt. % solids in o-xylene, 150 g) is preheated to 150° C., and is then added to the isocyanate-terminated prepolymer. The mixture is allowed to react for 30 min., and is then cooled to 90° C. and diluted with mineral spirits to 60% solids.

The product can be used directly as a coating system after adding 0.01 wt. % of a metal drier system. Samples drawn into coatings using a number 6 bar produce a 1-mil film with a 30-min. tack-free time. The resulting coatings achieve a B pencil hardness in 24 h, and an HB hardness in 4.5 days. An advantage of this system is its excellent compatibility with commercial uralkyd interior varnish systems.

EXAMPLE 10

Preparation of a Polyurethane-Modified Alkyd (Uralkyd) Coating

This example illustrates the preparation of a uralkyd coating from the reaction of an isocyanate-capped monoglyceride and a partially esterified phenolic resin polyol.

A one-liter reactor equipped with a Dean-Stark trap and conderiser is charged with a 6-functional phenolic resin polyol as prepared in Example 3 (200 g) and XTOL-100 tall oil system (161 g, product of Georgia-Pacific Resins, Inc. that contains about 45% oleic acid, 40% linoleic acid, and remainder of acidic, highly unsaturated products). o-Xylene (40 g) is added to the mixture, and the Dean-Stark trap is filled with o-xylene. The mixture is heated to 245° C. for 6 h (or to carboxyl number less than 15) while maintaining a reflux. The product is a partially esterified phenolic resin polyol.

The partially esterified phenolic resin polyol is then reacted with an isocyanate-terminated prepolymer as prepared in Example 9 to produce a coating system that has good compatibility with alkyd and uralkyd coatings, good performance, and fast dry to tack-free times.

EXAMPLE 11

Preparation of a 6-Functional Phenolic Resin Polyol using Formaldehyde as a Coupling Agent A low-cost phenolic resin polyol can be made by using a simple aldehyde (such as formaldehyde) as a coupling agent in place of some or all of the divinylbenzene normally used. These phenolic resin polyols provide cost advantages for the same polymer products (polyurethanes, polyesters, alkyds, etc.) described above.

A three-liter resin kettle equipped with mechanical stirrer, addition funnel, condenser/Dean-Stark trap, and inlets for nitrogen and vacuum, is charged with bisphenol A (565 g) and o-xylene (200 g), and the mixture is heated to 140° C. under nitrogen. Methanesulfonic acid (70%, 0.6 g) is added. α-Methylstyrene (292 g) is added, and the mixture is allowed to react for an additional 10 min. at 140° C. following the addition. The decanter is filled with o-xylene. Formaldehyde (50%, 130 g) is added in slow, continuous drops over 1 h, and water is removed continuously by azeotropic distillation. After formaldehyde addition is complete, the mixture is heated at 150–160° C. for 20 min. Vinyl toluene (487 g) is added at 150° C. over 30 min., and the mixture is kept at 150° C. for another 40 min. Potassium hydroxide solution (50%, 2.0 g) is added, followed by propylene carbonate (436 g), and the mixture is heated at 170° C. for 14 h with an open system to vent carbon dioxide generated in the reaction. Analysis by FTIR indicates >90% conversion of propylene carbonate. Mineral spirits (400 g) is added, and the mixture is heated to 170° C. The hot mixture is filtered using a 30 micron fritted glass funnel and CELITE 545 filter aid. The filtrate is recharged to the reactor, heated to 160–170° C., and distilled under vacuum (17 in. Hg) to remove all solvent. The mixture is cast into an aluminum pan and allowed to cool and flake.

EXAMPLE 12

Preparation of a Polyurethane-Modified Alkyd (Uralkyd) Coating

A one-liter reactor equipped with a Dean-Stark trap and condenser is charged with a 6-functional phenolic resin polyol as prepared in Example 11 (200 g) and XTOL-100 tall oil system (161 g, product of Georgia-Pacific Resins, Inc. that contains about 45% oleic acid, 40% linoleic acid, and remainder of acidic, highly unsaturated products). o-Xylene (40 g) is added to the mixture, and the Dean-Stark trap is filled with o-xylene. The mixture is heated to 245° C. for 6 h while maintaining a reflux (to carboxyl number 26).

Fatty acids (about 22 g) are vacuum distilled from the reactor at 245° C. over 1 h to give a product having carboxyl number 9. The product is a partially esterified phenolic resin polyol.

The partially esterified phenolic resin polyol is then reacted with an isocyanate-terminated prepolymer as prepared in Example 9 to produce a coating system that has good compatibility with alkyd and uralkyd coatings, good performance, and fast dry to tack-free times.

EXAMPLE 13

Preparation of a Polyurethane-Modified Alkyd (Uralkyd) Coating

A 100-mL beaker is charged with a magnetic stir bar and a portion of the partially esterified 6-functional phenolic resin polyol prepared in Example 10 (70 wt. % solids, 28.6 g). The mixture is heated to 150° C., and a sample of the monoglyceride prepared in Example 9 (10 g) is added. Isophorone diisocyanate (5.0 g) is added, and the reaction temperature is kept at 150° C. for 20 min. The reaction mixture is diluted to 60 wt. % solids with mineral spirits. A portion of this solution (5 g) is mixed with 0.01 g of a metal drier package, and is drawn down into a coating on a steel plate using a number 6 bar. The 1-mil coating sample is tack-free in 4 h. Pencil hardness is 5B in 24 h, and 1B in 3 days. The sample continues to harden, and achieves HB in 10 days. Adhesion is maintained at a 5B (cross hatch back side impact) up to impacts greater than 60 inch pounds.

EXAMPLE 14

Preparation of a Polyester-Modified Alkyd Coating

A 50-mL beaker is charged with a portion (10 g) of the 6-functional phenolic resin polyol of Example 3. Maleic anhydride (1.0 g) is added, and the mixture is heated to a homogeneous melt at 230° C. Heating continues at that temperature for 10 min. Next, tung oil (7.0 g) is added, and heating continues at 260° C. for 25 min. On cooling to 200° C., a 3-g aliquot is mixed with mineral spirits (3 g). The coating solution is cooled to room temperature and a drop of cobalt-based drier is added. The coating solution with driers is drawn into a coating using a No. 6 bar, and is allowed to air dry. The coating dries tack free in 2 h, and achieves an HB pencil hardness in 4 days. The coating shows lower color development and higher ultimate hardness than a coating prepared from the same materials, but without maleic anhydride addition.

EXAMPLE 15

Preparation of an Epoxy Coating

A 6-functional phenolic resin polyol prepared as in Example 3 (20 g) is dissolved in o-xylene (10 g) at 100° C. Trimellitic anhydride (10 g) and ethyldiethanolamine (0.2 g) are added, and the mixture is heated at 150° C. for 30 min. The reaction mixture is cooled to 90° C., and EPON 828 epoxy resin (20 g, product of Shell Chemical) is added, after which the sample is diluted to 60% solids with AROMATIC 100 solvent (product of Exxon Chemicals). The mixture is allowed to react and cool to 60° C., and is then coated on a steel plate using a number 2 bar to give a 0.30 mil coating after cure. The coating is cured for 10 min. at 150° C. to give a hard (3H) coating that exhibits high gloss and clarity. The coating has a high hardness even at 100° C.

EXAMPLE 16

Preparation of a 6-Functional Phenolic Resin "Hybrid" Polyol Having Both Phenolic and Aliphatic Hydroxyl Groups The apparatus of Example 1 is used. The reactor is charged with bisphenol A (565 g) and o-xylene (200 g), and is heated to 140° C. under nitrogen. Methanesulfonic acid (70%, 0.6 g) is added, and water is removed by azeotropic distillation. Divinylbenzene (80%, 268 g) is added over 15 min. at 150–160° C., and the mixture is kept at that temperature for another 5 min. T-butylstyrene (662 g) is added over 20 min. at 150–160° C., and heating continues at that temperature for one more hour. Aqueous potassium hydroxide (50% solution, 1.8 g) is added at 160° C., and water is removed by azeotropic distillation.

Propylene carbonate (252 g, an amount sufficient to react with half of the phenolic hydroxyl groups) is added at 170° C., and the mixture is heated at 170° C. for 8 h, or until propylene carbonate conversion exceeds 90%. Mineral spirits (450 g) is added, and the mixture is heated to 170° C. The hot mixture is filtered using a 30 micron fritted glass funnel and CELITE 545 filter aid. The filtrate is recharged to the reactor, heated to 160–170° C., and distilled under vacuum (27 in. Hg) to remove all solvent. The mixture is cast into an aluminum pan and allowed to cool and flake.

EXAMPLE 17

Preparation of an Epoxy Coating

A sample of the "hybrid" phenolic resin polyol of Example 16 (7.0 g) is dissolved in o-xylene (10 g). EPON 828 epoxy resin (7.0 g, product of Shell Chemical) and ethyldiethanolamine (0.3 g) are added. The mixture is heated to 60° C., and then drawn down into a film on a steel test plate using a number 2 bar. The coating is cured for 10 min. at 150° C. A durable coating having good adhesion, an immediate pencil hardness of 3H, and good cross-hatch adhesion is obtained.

EXAMPLE 18

Preparation of an Acrylate/Urethane Coating

A one-liter resin kettle equipped with a Dean-Stark trap, condenser, and nitrogen sparger is charged with a 6-functional phenolic resin polyol prepared as in Example 3 (200 g, 0.57 eq), 1,6-hexanediol diacrylate (200 g), acrylic acid (21 g), methyl hydroquinone (0.5 g), octane (100 g), and methanesulfonic acid (70%, 0.3 g). The mixture is heated to 125° C., and water is removed by azeotropic distillation. When the reaction is complete, the mixture is diluted with toluene, and is extracted with dilute aqueous potassium bicarbonate solution to wash out methanesulfonic acid. The organic phase is charged to a clean reactor and all solvent is removed by vacuum distillation. Sufficient 1,6-hexanediol diacrylate is added to the reaction mixture to reduce the phenolic resin polyol acrylate concentration to 40 wt. %. The viscosity of this solution is 3000 cps.

A 10-g aliquot of the reaction mixture concentrate is reacted with isophorone diisocyanate (0.6 g) to produce a urethane-linked phenolic resin polyol having pendant acrylate groups. The resulting urethane-acrylate is further diluted with 1,6-hexanediol diacrylate to a 30 wt. % urethane component.

An oak floor sample is sealed with thermoplastic urethane printer, and is sanded. The urethane/acrylate coating described above is combined with benzophenone (2 wt. %) and ethyldiethanolamine (2 wt. %), and the resulting coating composition is applied to the oak sample. A microscope slide is placed over the coating to exclude oxygen, and the sample is irradiated with UV light for 5 min. The slide is removed. A strong, adherent coating having a 3H pencil hardness remains. The coating resists cracking on impacts of 5 to 20 inch pounds.

EXAMPLE 19

Preparation of a Melamine-Crosslinked Coating

The procedure of Example 3 is generally used to prepare a 6-functional phenolic resin polyol, except that ethylene carbonate (436 g) is used instead of propylene carbonate. In addition, o-xylene is used instead of mineral spirits as a filtration solvent. This phenolic resin polyol is used to make a melamine-crosslinked coating as follows.

A sample of the phenolic resin polyol (20 g) and CYMEL 303 crosslinking agent (5 g, product of American Cyanamid) are dissolved in a (3:7) methanol/1-butanol solvent system at 60 wt. % solids. Two drops of a silicone leveling agent SILWET L-7602 (product of OSi Specialties) and a phosphate ester catalyst are added. Coatings are drawn down into 2-mil wet coatings on steel test panels, and are cured at 300° C. for 10 min. A very hard coating showing exceptional adhesion properties results.

The preceding examples are meant only as illustrations; the following claims define the scope of the invention.

We claim:

1. A polymer which comprises the reaction product of:
   (a) a phenolic resin polyol, said polyol comprising a reaction product made by reacting under oxyalkylation conditions (i) an aralkylated phenol or (ii) a phenol aralkylation polymer with an oxyalkylating agent, wherein said reacting adds aliphatic hydroxyl groups to said aralkylated phenol or to said phenol aralkylation polymer, wherein said aralkylated phenol is made by aralkylating a phenolic monomer with at least one styrene derivative;
   (b) optionally, a reactive diluent selected from the group consisting of polyether and polyester polyols; and
   (c) a member selected from the group consisting of:
      (1) a melamine resin, to produce a melamine-linked polymer;
      (2) a di- or polyisocyanate or an isocyanate-terminated prepolymer, to produce a polyurethane;
      (3) a fatty acid ester, a di- or polyisocyanate, and optionally, an anhydride, to produce a polyurethane-modified alkyd curable with an alkyd drying agent; and
      (4) an acrylic or methacrylic acid or ester, to produce a cured acrylate composition.

2. The polymer of claim 1 wherein the oxyalkylating agent is selected from the group consisting of alkylene oxides and alkylene carbonates.

3. The polymer of claim 2 wherein the oxyalkylating agent is selected from the group consisting of ethylene oxide, propylene oxide, isobutylene oxide, 1,2-butylene oxide, 2,3-butylene oxide, ethylene carbonate, propylene carbonate and butylene carbonates.

4. A polymer which comprises the reaction product of:
   (a) a phenolic resin polyol, said polyol comprising a reaction product made by reacting under oxyalkylation conditions (i) an aralkylated phenol or (ii) a phenol aralkylation polymer with an oxyalkylating agent, wherein said reacting adds aliphatic hydroxyl groups to said aralkylated phenol or to said phenol aralkylation polymer, wherein said aralkylated phenol is made by aralkylating a phenolic monomer with at least one styrene derivative;
   (b) optionally, a reactive diluent selected from the group consisting of polyether and polyester polyols; and
   (c) a member selected from the group consisting of:
      (1) a melamine resin, to produce a melamine-linked polymer;
      (2) a di- or polyisocyanate or an isocyanate-terminated prepolymer, to produce a polyurethane;
      (3) a fatty acid to produce an alkyd curable with an alkyd drying agent;
      (4) a fatty acid ester and, optionally, an anhydride, to produce an alkyd curable with an alkyd drying agent;
      (5) a fatty acid ester, a di- or polyisocyanate, and optionally, an anhydride, to produce a polyurethane-modified alkyd curable with an alkyd drying agent; and
      (6) an acrylic or methacrylic acid or ester, to produce a cured acrylate composition,
         wherein the reaction product of said phenol aralkylation polymer and said oxyalkylating agent has an average hydroxyl functionality within the range of about 2 to about 10 and wherein the oxyalkylating agent is selected from the group consisting of ethylene oxide, propylene oxide, isobutylene oxide, 1,2-butylene oxide, 2,3-butylene oxide, ethylene carbonate, propylene carbonate and butylene carbonates.

5. The polymer of claim 2 wherein the phenolic monomer is selected from the group consisting of phenol, bisphenol A, bisphenol F, hydroquinone, resorcinol, catechol, p-t-butyl phenol, p-cumyl phenol, and p-octyl phenol.

6. The polymer of claim 5 wherein the styrene derivative is selected from the group consisting of styrene, α-methylstyrene, vinyltoluenes, t-butylstyrenes, ethylstyrenes, di-t-butylstyrenes, and mixtures thereof.

7. A polymer which comprises the reaction product of:
   (a) a phenolic resin polyol, said polyol comprising a reaction product made by reacting under oxyalkylation conditions (i) an aralkylated phenol or (ii) a phenol aralkylation polymer with an oxyalkylating agent, wherein said reacting adds aliphatic hydroxyl groups to said aralkylated phenol or to said phenol aralkylation polymer, wherein said aralkylated phenol is made by aralkylating a phenolic monomer with at least one styrene derivative;
   (b) optionally, a reactive diluent selected from the group consisting of polyether and polyester polyols; and
   (c) a member selected from the group consisting of:
      (1) a melamine resin, to produce a melamine-linked polymer;
      (2) a di- or polyisocyanate or an isocyanate-terminated prepolymer, to produce a polyurethane;
      (3) a fatty acid to produce an alkyd curable with an alkyd drying agent;
      (4) a fatty acid ester and, optionally, an anhydride, to produce an alkyd curable with an alkyd drying agent;
      (5) a fatty acid ester, a di- or polyisocyanate, and optionally, an anhydride, to produce a polyurethane-modified alkyd curable with an alkyd drying agent; and
      (6) an acrylic or methacrylic acid or ester, to produce a cured acrylate composition,
         wherein the phenol aralkylation polymer is produced by reacting an aralkylated phenol with an aryl diolefin to produce the phenol aralkylation polymer.

8. The polymer of claim 7 wherein the aryl diolefin is selected from the group consisting of diisopropenylbenzenes, divinylbenzenes and mixtures thereof.

9. A polymer which comprises the reaction product of:
(a) a phenolic resin polyol, said polyol comprising a reaction product made by reacting under oxyalkylation conditions (i) an aralkylated phenol or (ii) a phenol aralkylation polymer with an oxyalkylating agent, wherein said reacting adds aliphatic hydroxyl groups to said aralkylated phenol or to said phenol aralkylation polymer, wherein said aralkylated phenol is made by aralkylating a phenolic monomer with at least one styrene derivative;
(b) optionally, a reactive diluent selected from the group consisting of polyether and polyester polyols; and
(c) a member selected from the group consisting of:
(1) a melamine resin, to produce a melamine-linked polymer;
(2) a di- or polyisocyanate or an isocyanate-terminated prepolymer, to produce a polyurethane;
(3) a fatty acid to produce an alkyd curable with an alkyd drying agent;
(4) a fatty acid ester and, optionally, an anhydride, to produce an alkyd curable with an alkyd drying agent;
(5) a fatty acid ester, a di- or polyisocyanate, and optionally, an anhydride, to produce a polyurethane-modified alkyd curable with an alkyd drying agent; and
(6) an acrylic or methacrylic acid or ester, to produce a cured acrylate composition,
wherein the phenol aralkylation polymer is produced by reacting a phenolic monomer with an aryl diolefin to obtain a phenol/aryl diolefin polymer, and then aralkylating the phenol/diaryl olefin polymer with at least one styrene derivative to produce the phenol aralkylation polymer.

10. The polymer of claim 9 wherein the phenolic monomer is selected from the group consisting of phenol, bisphenol A, bisphenol F, hydroquinone, resorcinol, catechol, p-t-butyl phenol, p-cumyl phenol, and p-octyl phenol.

11. The polymer of claim 10 wherein the styrene derivative is selected from the group consisting of styrene, a-methylstyrene, vinyltoluenes, t-butylstyrenes, ethylstyrenes, di-t-butylstyrenes, and mixtures thereof.

12. The polymer of claim 11 wherein the aryl diolefin is selected from the group consisting of diisopropenylbenzenes, divinylbenzenes and mixtures thereof.

13. A polymer which comprises the reaction product of:
(a) a phenolic resin polyol, said polyol comprising a reaction product made by reacting under oxyalkylation conditions (i) an aralkylated phenol or (ii) a phenol aralkylation polymer with an oxyalkylating agent, wherein said reacting adds aliphatic hydroxyl groups to said aralkylated phenol or to said phenol aralkylation polymer, wherein said aralkylated phenol is made by aralkylating a phenolic monomer with at least one styrene derivative;
(b) optionally, a reactive diluent selected from the group consisting of polyether and polyester polyols; and
(c) a member selected from the group consisting of:
(1) a melamine resin, to produce a melamine-linked polymer;
(2) a di- or polyisocyanate or an isocyanate-terminated prepolymer, to produce a polyurethane;
(3) a fatty acid to produce an alkyd curable with an alkyd drying agent;
(4) a fatty acid ester and, optionally, an anhydride, to produce an alkyd curable with an alkyd drying agent;
(5) a fatty acid ester, a di- or polyisocyanate, and optionally, an anhydride, to produce a polyurethane-modified alkyd curable with an alkyd drying agent; and
(6) an acrylic or methacrylic acid or ester, to produce a cured acrylate composition,
wherein the phenol aralkylation polymer is produced by reacting a phenolic monomer with an aldehyde coupling agent to obtain a phenolic/aldehyde condensation polymer, and then alkylating the condensation polymer with at least one styrene derivative to produce the phenol aralkylation polymer.

14. The polymer of claim 13 wherein the aldehyde coupling agent is selected from the group consisting of formaldehyde, acetaldehyde, benzaldehyde, and glyoxal.

15. The polymer of claim 14 wherein the phenolic monomer is selected from the group consisting of phenol, bisphenol A, bisphenol F, hydroquinone, resorcinol, catechol, p-t-butyl phenol, p-cumyl phenol, and p-octyl phenol.

16. The polymer of claim 15 wherein the styrene derivative is selected from the group consisting of styrene, α-methylstyrene, vinyltoluenes, t-butylstyrenes, ethylstyrenes, di-t-butylstyrenes, and mixtures thereof.

17. A polymer which comprises the reaction product of:
(a) a phenolic resin polyol, said polyol comprising a reaction product made by reacting under oxyalkylation conditions (i) an aralkylated phenol or (ii) a phenol aralkylation polymer with an oxyalkylating agent, wherein said reacting adds aliphatic hydroxyl groups to said aralkylated phenol or to said phenol aralkylation polymer, wherein said aralkylated phenol is made by aralkylating a phenolic monomer with at least one styrene derivative;
(b) optionally, a reactive diluent selected from the group consisting of polyether and polyester polyols; and
(c) a member selected from the group consisting of:
(1) a melamine resin, to produce a melamine-linked polymer;
(2) a di- or polyisocyanate or an isocyanate-terminated prepolymer, to produce a polyurethane;
(3) a fatty acid to produce an alkyd curable with an alkyd drying agent;
(4) a fatty acid ester and, optionally, an anhydride, to produce an alkyd curable with an alkyd drying agent;
(5) a fatty acid ester, a di- or polyisocyanate, and optionally, an anhydride, to produce a polyurethane-modified alkyd curable with an alkyd drying agent; and
(6) an acrylic or methacrylic acid or ester, to produce a cured acrylate composition,
wherein the phenol aralkylation polymer is produced by reacting a phenolic monomer with a styrene derivative to produce an aralkylated phenol, and the aralkylated phenol is then reacted with an aldehyde coupling agent to produce the phenol aralkylation polymer.

18. The polymer of claim 17 wherein the aldehyde coupling agent is selected from the group consisting of formaldehyde, acetaldehyde, benzaldehyde, and glyoxal.

19. The polymer of claim 18 wherein the phenolic monomer is selected from the group consisting of phenol, bisphenol A, bisphenol F, hydroquinone, resorcinol, catechol, p-t-butyl phenol, p-cumyl phenol, and p-octyl phenol.

20. The polymer of claim 19 wherein the styrene derivative is selected from the group consisting of styrene, α-methylstyrene, vinyltoluenes, t-butylstyrenes, ethylstyrenes, di-t-butylstyrenes, and mixtures thereof.

21. A polymer which comprises the reaction product of:
(a) a phenolic resin polyol, said polyol comprising a reaction product made by reacting under oxyalkylation conditions (i) an aralkylated phenol or (ii) a phenol aralkylation polymer with an oxyalkylating agent, wherein said reacting adds aliphatic hydroxyl groups to said aralkylated phenol or to said phenol aralkylation polymer, wherein said aralkylated phenol is made by aralkylating a phenolic monomer with at least one styrene derivative;
(b) optionally, a reactive diluent selected from the group consisting of polyether and polyester polyols; and
(c) a member selected from the group consisting of:
(1) a melamine resin, to produce a melamine-linked polymer;
(2) a di- or polyisocyanate or an isocyanate-terminated prepolymer, to produce a polyurethane;
(3) an unsaturated fatty acid suitable for producing an alkyd curable with an alkyd drying agent;
(4) an unsaturated fatty acid ester and, optionally, an anhydride, suitable for producing an alkyd curable with an alkyd drying agent;
(5) a fatty acid ester, a di- or polyisocyanate, and optionally, an anhydride, to produce a polyurethane-modified alkyd curable with an alkyd drying agent; and
(6) an acrylic or methacrylic acid or ester, to produce a cured acrylate composition.

22. The polymer of claim 21 wherein the oxyalkylating agent is selected from the group consisting of alkylene oxides and alkylene carbonates.

23. The polymer of claim 22 wherein the oxyalkylating agent is selected from the group consisting of ethylene oxide, propylene oxide, isobutylene oxide, 1,2-butylene oxide, 2,3-butylene oxide, ethylene carbonate, propylene carbonate and butylene carbonates.

24. The polymer of claim 23 wherein the reaction product of said phenol aralkylation polymer and said oxyalkylating agent has an average hydroxyl functionality within the range of about 2 to about 10.

25. The polymer of claim 24 wherein the phenolic monomer is selected from the group consisting of phenol, bisphenol A, bisphenol F, hydroquinone, resorcinol, catechol, p-t-butyl phenol, p-cumyl phenol, and p-octyl phenol.

26. The polymer of claim 25 wherein the styrene derivative is selected from the group consisting of styrene, α-methylstyrene, vinyltoluenes, t-butylstyrenes, ethylstyrenes, di-t-butylstyrenes, and mixtures thereof.

27. The polymer of claim 21 wherein the phenol aralkylation polymer is produced by reacting an aralkylated phenol with an aryl diolefin to produce the phenol aralkylation polymer.

28. The polymer of claim 27 wherein the aryl diolefin is selected from the group consisting of diisopropenylbenzenes, divinylbenzenes and mixtures thereof.

29. The polymer of claim 21 wherein the phenol aralkylation polymer is produced by reacting a phenolic monomer with an aryl diolefin to obtain a phenol/aryl diolefin polymer, and then aralkylating the phenol/diaryl olefin polymer with at least one styrene derivative to produce the phenol aralkylation polymer.

30. The polymer of claim 29 wherein the phenolic monomer is selected from the group consisting of phenol, bisphenol A, bisphenol F, hydroquinone, resorcinol, catechol, p-t-butyl phenol, p-cumyl phenol, and p-octyl phenol.

31. The polymer of claim 30 wherein the styrene derivative is selected from the group consisting of styrene, a-methylstyrene, vinyltoluenes, t-butylstyrenes, ethylstyrenes, di-t-butylstyrenes, and mixtures thereof.

32. The polymer of claim 31 wherein the aryl diolefin is selected from the group consisting of diisopropenylbenzenes, divinylbenzenes and mixtures thereof.

33. The polymer of claim 21 wherein the phenol aralkylation polymer is produced by reacting a phenolic monomer with an aldehyde coupling agent to obtain a phenolic/aldehyde condensation polymer, and then alkylating the condensation polymer with at least one styrene derivative to produce the phenol aralkylation polymer.

34. The polymer of claim 33 wherein the aldehyde coupling agent is selected from the group consisting of formaldehyde, acetaldehyde, benzaldehyde, and glyoxal.

35. The polymer of claim 34 wherein the phenolic monomer is selected from the group consisting of phenol, bisphenol A, bisphenol F, hydroquinone, resorcinol, catechol, p-t-butyl phenol, p-cumyl phenol, and p-octyl phenol.

36. The polymer of claim 35 wherein the styrene derivative is selected from the group consisting of styrene, α-methylstyrene, vinyltoluenes, t-butylstyrenes, ethylstyrenes, di-t-butylstyrenes, and mixtures thereof.

37. The polymer of claim 21 wherein the phenol aralkylation polymer is produced by reacting a phenolic monomer with a styrene derivative to produce an aralkylated phenol, and the aralkylated phenol is then reacted with an aldehyde coupling agent to produce the phenol aralkylation polymer.

38. The polymer of claim 37 wherein the aldehyde coupling agent is selected from the group consisting of formaldehyde, acetaldehyde, benzaldehyde, and glyoxal.

39. The polymer of claim 38 wherein the phenolic monomer is selected from the group consisting of phenol, bisphenol A, bisphenol F, hydroquinone, resorcinol, catechol, p-t-butyl phenol, p-cumyl phenol, and p-octyl phenol.

40. The polymer of claim 39 wherein the styrene derivative is selected from the group consisting of styrene, α-methylstyrene, vinyltoluenes, t-butylstyrenes, ethylstyrenes, di-t-butylstyrenes, and mixtures thereof.

* * * * *

UNITED STATES PATENT AND TRADEMARK OFFICE
CERTIFICATE OF CORRECTION

PATENT NO. : 6,569,953 B1
DATED : May 27, 2003
INVENTOR(S) : David C. Dehm et al.

It is certified that error appears in the above-identified patent and that said Letters Patent is hereby corrected as shown below:

Column 2,
Line 5, "phenovaryl" has been replaced with -- phenol/aryl --;

Column 6,
Line 10, "sulionated" has been replaced with -- sulfonated --;
Line 51, "-C-$CO_2$-" has been replaced with -- -O-$CO_2$- --;

Column 16,
Line 59, "printer" has been replaced with -- primer --.

Signed and Sealed this

Thirtieth Day of September, 2003

JAMES E. ROGAN
*Director of the United States Patent and Trademark Office*